May 23, 1961 T. C. MANN 2,985,205
WOOD SHAPING MACHINE PROVIDED WITH MULTI-SURFACE CUTTING UNITS
Filed May 18, 1959 10 Sheets-Sheet 1

May 23, 1961 T. C. MANN 2,985,205
WOOD SHAPING MACHINE PROVIDED WITH MULTI-SURFACE CUTTING UNITS
Filed May 18, 1959 10 Sheets-Sheet 10

Fig. 15

INVENTOR
Theodore C. Mann
by Wolfe, Hubbard, Voit & Osann
ATTORNEYS

United States Patent Office 2,985,205
Patented May 23, 1961

2,985,205

WOOD SHAPING MACHINE PROVIDED WITH MULTI-SURFACE CUTTING UNITS

Theodore C. Mann, Beloit, Wis., assignor to Ekstrom-Carlson & Co., Rockford, Ill., a corporation of Illinois Filed May 18, 1959, Ser. No. 814,059

18 Claims. (Cl. 144—116)

This invention relates to a woodworking machine and more particularly to a high-speed production moulding machine. It has particular reference to a moulding machine of the type which incorporates four cutting head spindles so that the stock may be shaped on all four sides in one pass through the machine.

One object of the invention is to provide a moulding machine of the above character capable of shaping stock to precise dimensions, by means of individually powered high-speed heads permitting faster production and much smoother work which, in many cases, may be used without sanding.

Another object is to provide a plurality of individually driven cutting heads mounted either for vertical or horizontal movement upon the machine bed to and from set positions to shape the stock.

A further more specific object is to provide means for rapidly retracting and advancing the cutting heads to and from the set positions, so as to afford quick access to the bed of the machine for adjustment of the cutters or clearing of the machine, therefore providing a machine which may be operated at a higher production rate than that which has been obtainable heretofore with machines of this character.

Another object is to provide a machine equipped with mechanism enabling the operator to adjust the set positions of the cutting heads quickly and conveniently.

A still further object is to provide a machine of the foregoing type having a novel means for feeding and guiding the stock through the machine without excessive pressure or drag on the stock, thus minimizing the possibility of marring the surfaces of the stock and reducing the chances of the stock jamming in the machine.

A more specific object is to provide for floatably mounting rollers feeding the stock through the machine, and hold-down means engaging the stock by means of which the pressure applied to the stock by these devices is maintained uniform despite variations in stock thickness.

A further object is to provide a wood moulding machine of the character set forth which is of simplified construction yet provides for automatic positioning of its components.

Other objects and advantages will become apparent as the following description proceeds, taken in connection with the accompanying drawings, in which:

While the invention is susceptible of various modifications and alternative constructions, a certain illustrative embodiment has been shown in the drawings and will be described below in detail. It should be understood, however, that there is no intention to limit the invention to the specific form disclosed, but on the contrary the intention is to cover all modifications, alternative constructions and equivalents falling within the spirit and scope of the invention as expressed in the appended claims.

Figure 1:
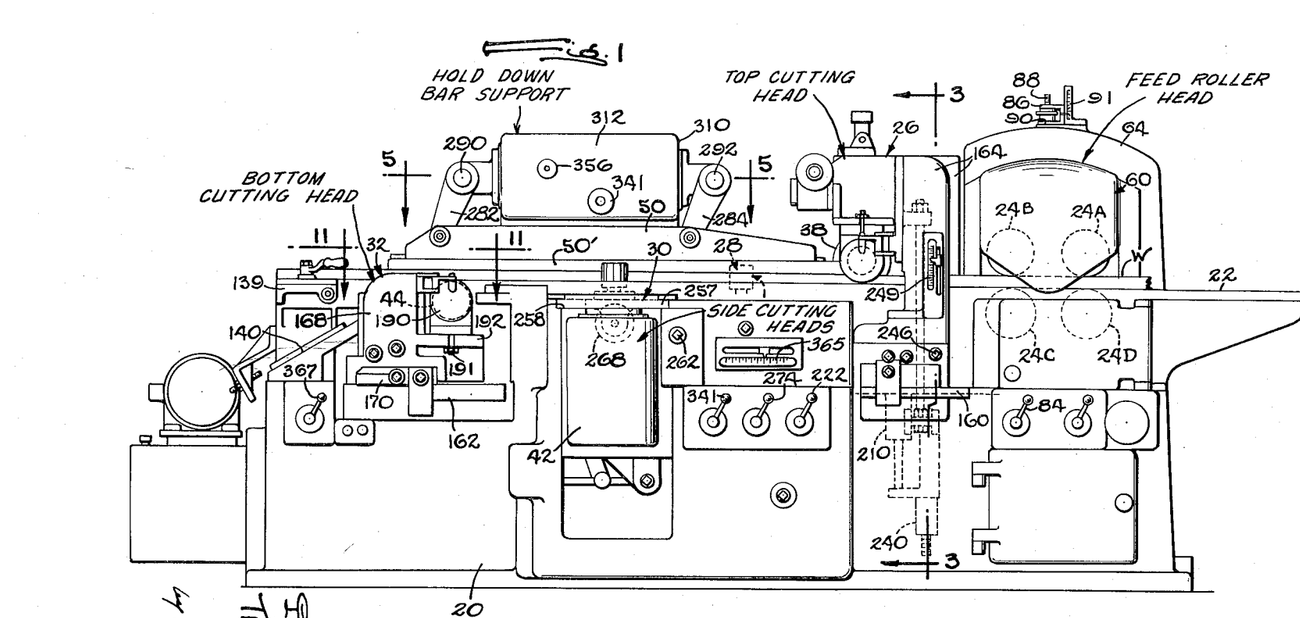
Figure 1 is a side elevational view of a moulding machine constructed in accordance with the invention.

The machine illustrated is a high-speed moulding machine shown in the drawings to comprise an elongated base 20 having an elongated, flat bed plate 22 on which the stock (W) moves progressively from right to left in Figure 1 through the machine. A piece of rough stock W, shown in Fig. 16 for example, may be fed between the feed rollers 24A–D at the right-hand end of the machine from a hopper (not shown) and through a straight path along the bed plate 22 to the opposite end of the machine, the stock receiving in one pass four successive cutting operations performed by a top cutting head 26 having a horizontal spindle mounted adjacent the feed rollers 24A–D, two vertical spindle supporting side cutting heads 28, 30 mounted in staggered relation to about the midpoint of the bed plate, and a bottom cutting head 32 having a horizontal spindle and following the side cutting heads 28, 30 adjacent the terminal end of the bed plate. These cutting heads are adapted to support rotatively driven spindles which carry suitable cutting tools or blades by means of which the rough stock (Fig. 16) in the form of a piece of lumber W may be shaped on all four sides as shown in this figure to make a piece of finished moulding.

In the particular machine illustrated, all the spindle supporting heads 26, 28, 30, 32 have individual, preferably water-cooled electric motors, 38, 40, 42, 44, in which the motor shafts comprise the cutter spindles. It is contemplated that cutters having a relatively small diameter, for example 3″, and operated at higher than usual speeds, will be employed on the machine so as to produce moulding having a smoother surface finish. Electric power at suitable frequencies to operate the motors at spindle speeds of 7,200, 10,800 and 13,400 r.p.m., required to operate the spindles and cutters properly may be obtained from an associated frequency changer or other similar power supply component. Cutter blades to provide any required contours for the stock may be mounted on the spindles.

The stock W is guided while fed to and through the feed rollers 24A–D by lateral guide plates 45 on the front and back of the bed plate 22 at the right end of the machine. The front guide has been removed in the machine shown in the drawings and therefore does not appear. To guide the stock while it is being shaped, a fixed stop guide or backing plate 46 (Fig. 2) is mounted on the bed along one side of the path of the stock, while a spring-biased group of roller arms 48 (Fig. 2) associated with the side cutter head 30 located to the front of the machine, which side cutter head is horizontally adjustable, serves to engage the opposite side of the stock to hold it firmly against the stock guide 46. The stock is held flat against the bed plate 22 during the shaping operation of the side cutters and bottom cutter by a hold-down bar 50 (Fig. 2) mounted for vertical movement over the bed plate 22.

Figure 2:
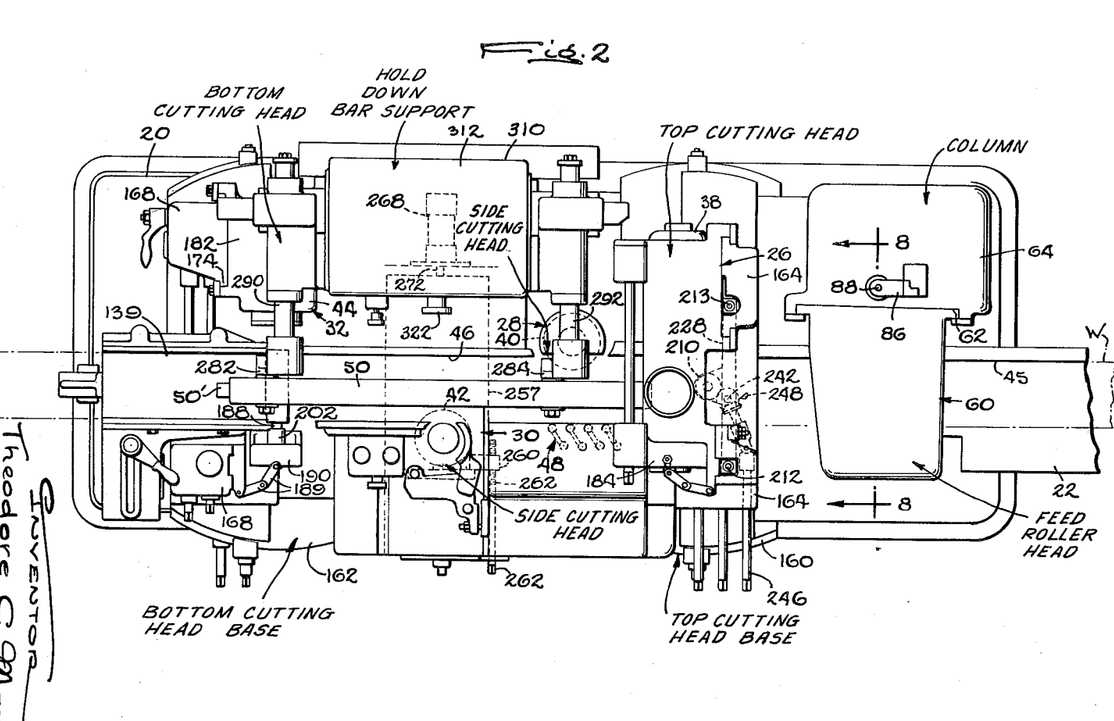
Fig. 2 is a plan view of the machine shown in Figure 1.
Figures 8, 9:
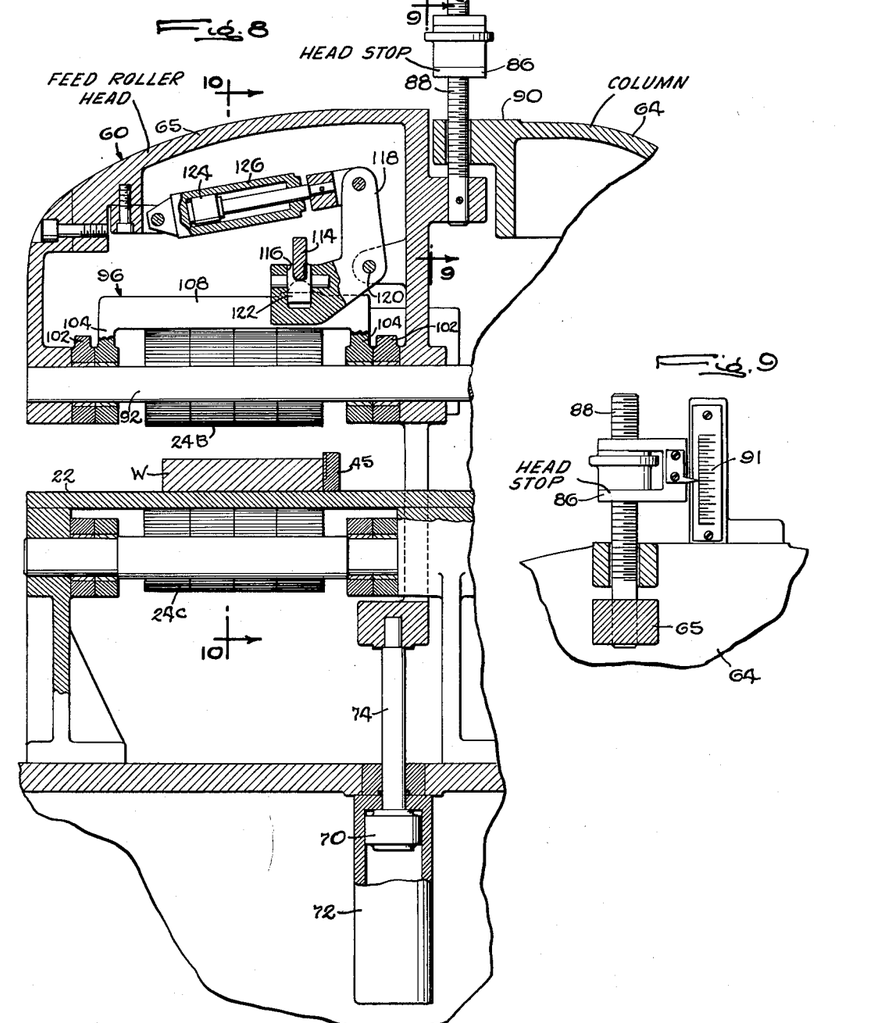
Fig. 8 is an enlarged fragmentary sectional view taken in the plane of lines 8—8 of Fig. 2.
Fig. 9 is an enlarged fragmentary view of the adjustable stop mechanism for the feed roller head, and is taken substantially in the plane of lines 9—9 of Fig. 8.
Figure 10:
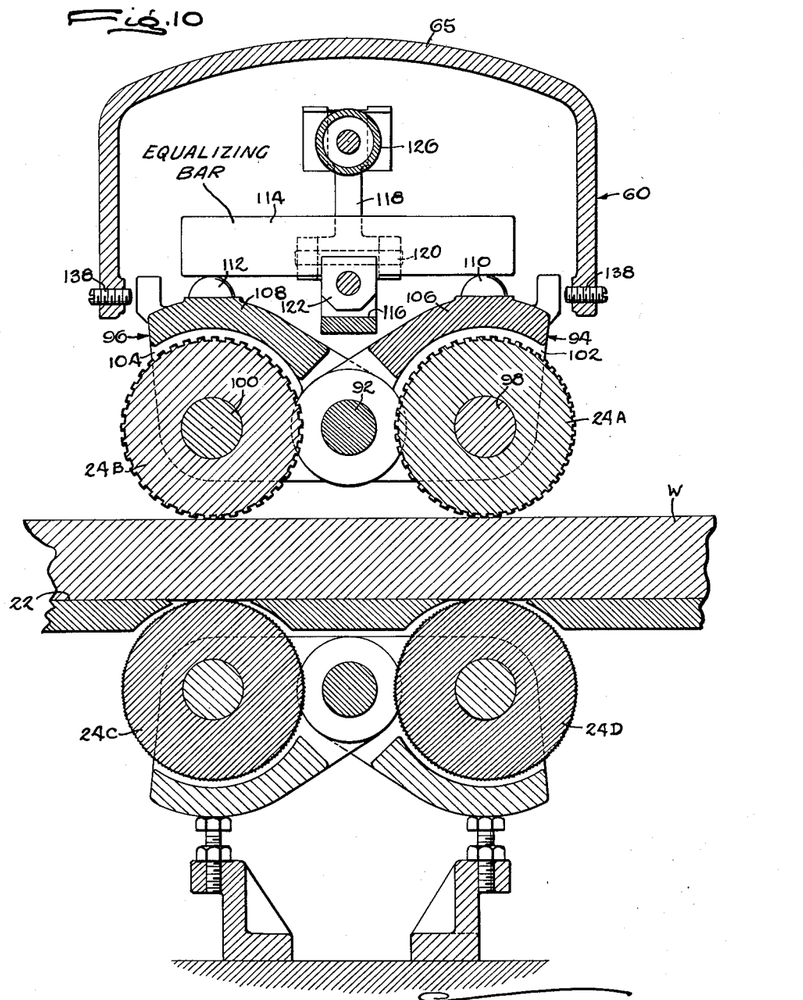
Fig. 10 is an enlarged fragmentary sectional view taken in the plane of lines 10—10 of Fig. 8.

For the production of moulding, stock lumber is fed into the right-hand end of the machine (Figure 1) between the power driven feed rollers 24A–D and shaped by the cutters carried by the cutter heads. Referring to Figs. 2, 8 and 10 the upper pair of feed rollers 24A, B is carried by a feed roller head 60 which is vertically adjustable over the bed plate 22 being mounted in offset relation on ways 62 machined on the face of a column at the right-hand end of the machine bed.

In setting up the machine, suitable cutter blades to shape the sides of the stock are mounted on the cutter head spindles. In cases where the right side of the stock (viewed from the end of the bed plate into which the stock is fed) is cut in an irregular convex contour, a negative of such contour may be made and fastened as a facing (not shown) on the stock guide or backing plate 46. It will be noted that due to the order in which the cutting heads are arranged in the machine, the top of the stock lumber is first shaped by cutters carried by the top cutting head 26. The right side matcher cutter mounted on the side cutting head 28 to shape the right side of the stock is located ahead of the left matcher cutter mounted on the side cutter head 30 so that the stock is first cut on the side having the fixed guide plate 46. The leading edge of the hold-down bar 50 is positioned adjacent the top cutter head 26 (Fig. 2) so that the stock moves smoothly under the bar and is maintained in contact with the stock guide as it emerges from the top cutters. Here again where an irregular contour is made, the hold-down bar 50 may have a facing 50' shaped to the contour of the top of the finished piece so as to avoid direct contact on edges of the surface of the stock which might mar or damage such edges. The spring-biased rollers 48 (Fig. 2) associated with the left side cutter head 30, engage the front or left side of the stock before it has been shaped by the left matcher cutter, thereby requiring no facing, and maintain the stock firmly against the guide plate 46.

In accordance with one of the major features of the invention, the components of the machine which normally block ready access to the bed plate 22, namely the feed roller head, hold-down bar, and the top cutter head, all of which are mounted above the bed plate; and the left side cutter head which is mounted in front of the bed plate; are all slidably supported on ways for movement to and from a set-operative-position and, furthermore, each of these components are positionable along the ways by hydraulically operated means which permit rapid advancement to and retraction from the set positions under the control of the operator. Further in keeping with the invention, adjustable stop mechanisms are associated with each of these components so that the set positions of the components may be quickly, conveniently and precisely adjusted by the operator to obtain the particular contours and dimensions required for the finished work. This permits the components to be retracted, for example to provide accessibility to the bed for adjustments or to clear jammed pieces, and then advanced to their exact set positions without readjustment.

*Feed roller assembly*

The rough stock is fed onto the bed plate 22 at the right-hand end of the machine as viewed in Figure 1, between the upper and lower pairs of feed rollers 24A–D which feed the stock from right to left for the successive cutting operations. As indicated above, referring to Figs. 2, 8 and 10, the top or upper pair of feed rollers 24A, B are carried by a feed roller head 60 which is adjustably mounted adjacent the end of the bed plate on a vertical way surface 62 (Fig. 2) provided by a fixed column 64 carried by the base of the machine and extending above the bed plate. The lower feed rollers 24C, D (Fig. 8) are fixed below the bed to engage the bottom surface of stock passing along the bed plate 22. The spacing of the pairs of upper and lower feed rollers is set in accordance with the stock thickness and these pairs of rollers act to feed the stock.

Figure 15:
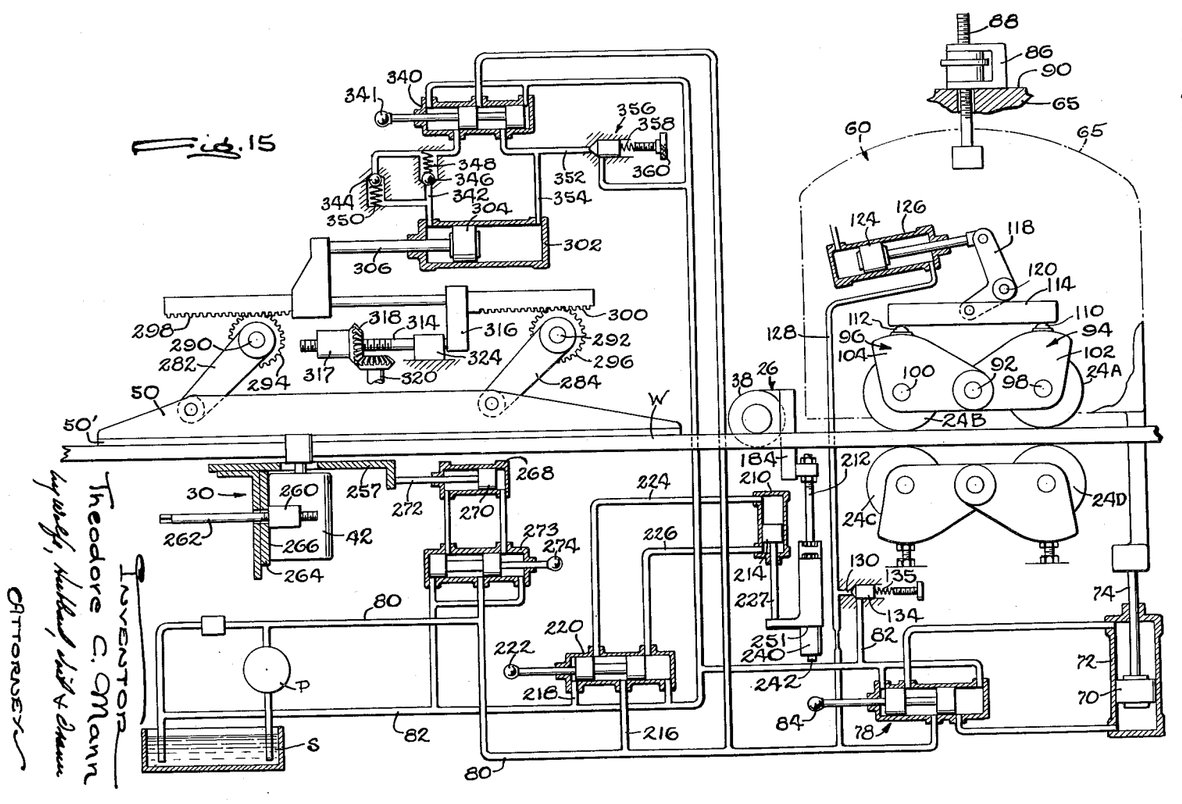
Fig. 15 is a diagrammatic view showing the hydraulic circuit for positioning the side cutter head and hold-down bar.

As shown best in Figs. 2, 8 and 10, the feed roller head 60 comprises a hollow casing 65 held against the column way 62 (Fig. 2) by clamps engaging the casing adjacent its lateral edges. Downward vertical movement of the head to lower the pair of feed rollers 24A, B to a set position, or to lift the head and thereby raise the rollers to allow access to the bed plate 22, is effected by a hydraulic piston 70 slidably received in a power cylinder 72 mounted on the base 20 of the machine below the bed plate 22 and connected to the casing by a rod 74. The hydraulic cylinder 72 is supplied with fluid from a pump P, as shown in Fig. 15, under the control of a manually actuated valve 78 adapted to selectively connect the supply line 80 or the return line 82 connected to the pump, to each end of the cylinder 72. The valve handle 84 is located on the front of the machine (Figure 1) to be moved by the machine operator. In the position of the valve handle 84 shown in Fig. 15, fluid under pump pressure is supplied from the supply line 80 to the upper end of the cylinder 72. The lower end of the cylinder 72 is connected by the valve 78 to the sump S through the return line 82 in the position of the valve shown. To lift the feed roller head 60, the valve is moved to the right in Fig. 15, to connect the upper end of the cylinder 72 to the sump S and the lower end to the supply line 80 to the pressure side of the pump P.

The set position of the feed roller head 60 is determined by a stop 86 carried by the casing 65 by means of a threaded rod 88 so as to engage a stop surface 90 on the upper edge of the fixed column 64. The stop 86 is adjustable by turning the same on the threaded rod 88 and for convenience a fixed scale 91 may be included on the column to indicate to the operator without measurement by means of a pointer the position of the feed rolls relative to the bed plate 22.

The feed roller head 60 (Fig. 2) is mounted in offset relation with respect to the vertical way 62 on the column 64 and includes, as shown in Fig. 10, a fixed horizontal shaft 92 on which the feed rollers 24A, B are pivotally mounted, the shaft being positioned above the bed plate 22 and extending transversely of the latter. Upon movement downwardly of the feed roller head 60 toward the bed plate 22 effected by means of the hydraulic piston 70, the feed rollers 24A, B are positioned to engage the top surface of the rough stock as it is fed into the machine. It is contemplated that the stop 86 should be adjusted low enough so that the feed rollers 24A, B apply a positive pressure on the top of the stock W. It will be evident that with this stop mechanism, the feed roller head 60 may be lowered into set position quickly and conveniently, since no adjustment of any kind is required, so that upon pressure fluid being supplied to the cylinder 72 under the control of the operator-positioned valve 78, the feed roller head is lowered directly to an operative position.

In carrying out the present invention, the feed roller head 60 includes a floating mounting for the pair of upper feed rollers 24A, B by means of which the pressure exerted by the latter on the stock is limited automatically to a predetermined value. To this end, each feed roller 24A, B is pivotally carried on the fixed shaft 92 within the head casing by yokes 94, 96 journaled on the shaft and supporting roller shafts 98, 100. Each yoke 94, 96 is formed with a pair of triangular legs 102, 104 (Figs. 8, 10) bridged by a straight back member 106, 108 which extends parallel with the feed roller shafts. A ball 110, 112 fixed to the top of each back member 106, 108 of each yoke engages the under side of an equalizing bar 114 spanning the rollers and pivotally mounted within a slot 116 at the free end of a bell crank 118 pivotally mounted in the feed roller head casing at the midpoint 120 of the bell crank. The equalizing bar 114 has a thickened mid-section 122 at which point it is pinned to the free end of the bell crank lever 118. The opposite end of the bell crank lever 118 is connected to a piston 124 slidably received in a cylinder 126 mounted in the feed roller head casing and supplied with fluid under pump pressure, as shown in Fig. 15, by means of a pipe 128 connected to the right end of the cylinder. The other end of the cylinder 126 is open to allow the piston to move freely responsive to fluid pressure. With this arrangement, each feed roller 24A, B floats to accommodate variations in stock thickness, or irregularities such as knots or the like, which, when the defect passes under the rollers, causes the same to lift momentarily. The stock thickness may vary as much as ½ inch while a defect of such size or larger may also be present. Such thickness variations cause a substantial lifting motion to be transmitted from the feed rollers through the floating mount to the cylinder and piston, as a consequence of the equalizing bar lifting with the feed rollers. A defect which is short in length, such as a knot, causes only one roller of the pair to lift at a time, and the equalizing bar 114 to fulcrum about the yoke-supported ball at the other end of the bar. Where a heavy piece of stock is fed under the rollers causing them to lift together, the equalizing bar 114 is lifted directly while remaining horizontal. In either case the bell crank 118 is caused to pivot about its fulcrum on the head casing, applying force tending to move the piston 124 to the right within the cylinder 126 and creating a back pressure in the supply line 128. This motion of the bell crank 118 about its fulcrum is resisted by the hydraulic pressure in the cylinder 126. In keeping with the present invention, to maintain the effective pressure exerted by the feed rollers 24A, B on the stock substantially constant, the supply line 128 connected to the cylinder 126 in the head casing is provided with a by-pass connection 130 leading to the return line 82 to the sump. A by-pass valve 134 is included in the by-pass connection having a spring 135 the pressure of which is adjustable by a screw to bias the valve 134 closed. The piston movement is opposed by the pressure of the fluid within the cylinder 126. Such movement of the piston forces fluid through the by-pass line 130 past the by-pass valve 134 to release the fluid forced from the cylinder thereby relieving the pressure and allowing the equalizing bar 114 and the rollers 24A, B to float upwardly to a position where the pressure exerted by the rollers is the limit set by the adjusting screw. The by-pass valve 134 thus tends to hold the pressure in the cylinder 126 at a constant predetermined value, and this means is effective regardless of the vertical position of the pair of upper rollers.

The pressure exerted by the feed rollers 24A, B is maintained constant despite variations of thickness of the lumber stock. Moreover, this means to limit the pressure exerted by the feed rollers is effective even though the stop 86 is set for a considerably lower position of the feed rollers than the thinness of the stock requires, and controls the pressure exerted by the feed rollers on the work when the feed roller head is lowered to its operative position. It will be understood that the force required to overcome the pressure applied against the piston 124 is the same regardless of the vertical position of the pair of feed rollers within the feed roller head casing.

The downward limits for the floating movement are determined by the stop screws 138 (Fig. 10) supported by the feed roller head casing 65. With no stock under the rollers 24A, B the feed rollers may drop to a predetermined lowered position under the pressure acting against the piston 124 (Fig. 8) and by virtue of the pivotal connection of the rollers on the transverse supporting shaft 92. When a piece of stock moves into engagement with the first feed roller 24A, the latter is lifted to its operative position. In a similar manner, the second feed roller 24B is engaged as the leading end of the stock W comes into contact with it and raised to its position on the upper surface of the stock. At this point, as shown in Fig. 10, some clearance should be present between the outer edges of the feed roller yokes 94, 96 and the adjustable stop screws 138 mounted in the head casing to allow the feed rolls to float and follow the surface of the stock.

Top and bottom cutting heads

In order to shape all four sides of the stock on one pass through the machine, as above mentioned four separate cutting heads are provided. The first and last cutting operations on the stock W are performed by the top cutting head 26 and the bottom cutting head 32, respectively. The top cutting head 26 is located at a point just following the feed roller head 60 while the bottom cutting head 32 is located adjacent the terminal edge of the bed plate 22 between the latter and a drop table 139 (Figure 1) which may be vertically adjusted on inclined ways 140 by hydraulic means not shown in detail.

One of the features afforded by both the top and the bottom cutting heads is that the axis of the spindles carrying the cutters may be inclined with respect to the direction of movement of the stock along the bed plate, so as to permit the use of straight cutter blades in place of the helical blades widely used heretofore. To permit such adjustment of the angle of inclination of the cutter spindles, the cutting heads 26, 32 are carried on the bed of the machine by means of a swivel mounting arrangement which is most clearly shown in connection with the top cutting head in Figs. 3 and 4, and in connection with the bottom cutting head in Figs. 11 and 12. It will be understood that the swivel mounting for both the top and bottom cutting heads are similarly arranged.

The swivel mounting for the heads in both cases comprises a fixed base 160, 162 located below the bed plate 22. The swivel bases are shown to have a curved outline in Fig. 2. Each swivel base 160, 162 carries a swivelable upright system for carrying the heads, including a pair of posts 164, 168 (Figs. 2–4, 11) straddling the bed plate 22 and bridged at the lower part by a common casing 169, 170 extending transversely of the bed plate. The top cutting head 26 and the bottom cutting head 32 are mounted for vertical movement on ways 172, 174 formed on the face of the upright posts 164, 168 straddling the bed plate. A clamp 176, 178 located on the front of the machine may be released or tightened by means of an adjustment screw to allow indexing of either swivelable upright system on the swivel base therefor so that the top and bottom cutting heads may be set at any desired cutting angle. In the present arrangements, note particularly Figs. 3 and 11, the upright posts 164, 168 form a rigid, upright structure. Both the top and the bottom cutting heads include, as shown in Figs. 3, 4, 11 and 12, two separable elements, namely, a slide 180, 182 for supporting the motor for each head, slidable vertically on one post of a pair, on one side of the bed plate, and an outboard bearing slide 184, 186 for supporting the outer end of the motor shaft slidable vertically on the other post of the same pair, on the opposite side of the bed plate.

Figure 11:
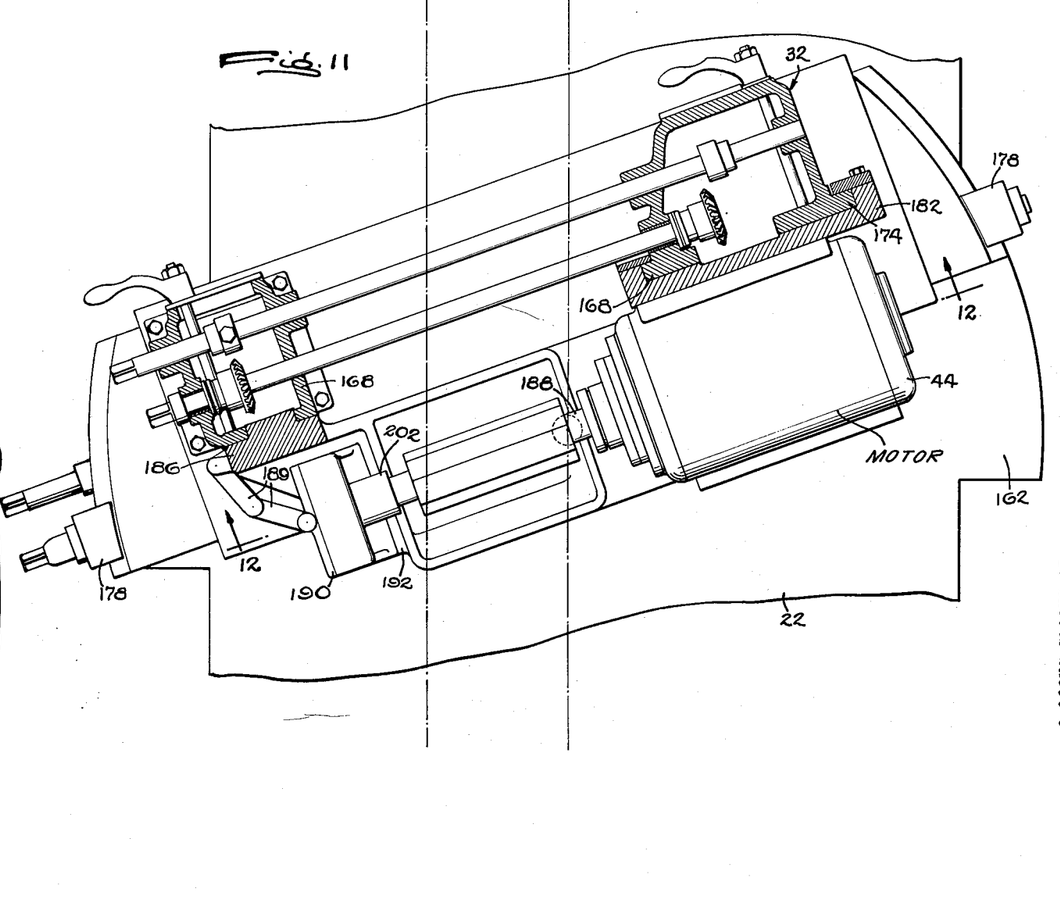
Fig. 11 is an enlarged fragmentary sectional view taken in the plane of lines 11—11 of Figure 1.

Turning now to Fig. 11 which shows the construction of the bottom cutting head, the motor 44 operating the bottom cutter is carried by means of the slide 182 which is carried on the face of the ways 174 on the swivelable upright post 168 on the back side of the bed plate. The drive motor 44 shown in this figure operates the bottom cutter directly, the latter being mounted on the motor shaft 188. To support the outer end of the motor shaft 188, it is rotatably carried by means of the outboard support 190 for the bottom cutting head, slidably mounted on a horizontal plate 192 fixed on the left slide 186 and carried by a pair of links 189 connected to the slide 186. This outboard support 190 embodies a drawbolt mechanism 194 (Fig. 14) for locking the outer end of the motor shaft 188 to the outboard support. A bearing 196 is used for rotatably supporting the shaft on the outboard support. The drawbolt includes a drawbolt shaft 198 mounted in a sleeve 202 which is carried by the ball bearing 196 within the outboard support. The drawbolt shaft 198 is threaded so as to be received in a threaded opening 204 in the end of the motor shaft. As a self-aligning feature, the end of the motor shaft 188 is tapered to be received in a tapered bore 208 within the sleeve. By turning the drawbolt shaft 198 as by means of a socket wrench on the end of the shaft, while holding the motor shaft against turning, the motor shaft and outboard support 190 may be drawn together in perfect alignment. The support 190 is then clamped to the plate 192 by drawing down the nut 191 threaded on a stud 193, Figure 12.

Figures 12, 13, 14:
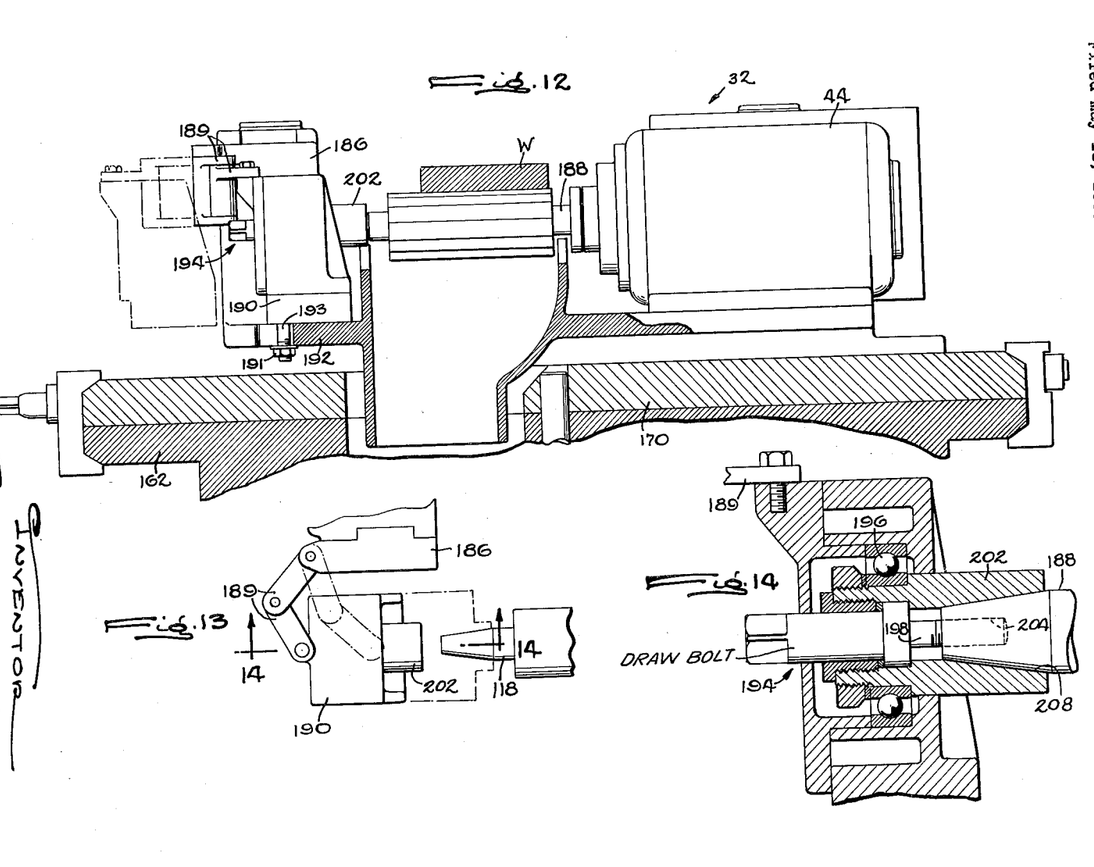
Fig. 12 is an enlarged fragmentary sectional view taken in the plane of lines 12—12 of Fig. 11.
Fig. 13 is an enlarged fragmentary elevational view showing the outboard bearing support for the bottom spindle.
Fig. 14 is an enlarged scale sectional view taken in the plane of lines 14—14 of Fig. 13.

The bottom cutting head including the motor and outboard support, may be raised and lowered for adjustment purposes to a suitable operative position with the cutter in engagement with a piece of stock carried on the surface of the bed plate. The bottom head is shown in an operative position in Fig. 12. Adjustment mechanism may be provided to raise and lower the head to provide adjustment for different cutting blades and for varying the thickness of the cut. Such a mechanism is shown in Fig. 11. As shown in Fig. 12, a sawdust conduit mounted below the bottom cutter may be employed to dispose of sawdust and chips as such is formed by the bottom cutter. Suction devices and chutes to convey chips and sawdust from all the heads are required on a machine of this type. Since they form no part of the present invention, these attachments except for parts actually formed with the cutting heads have been omitted from the drawings for the purpose of clarity.

Figures 3, 4, 16:
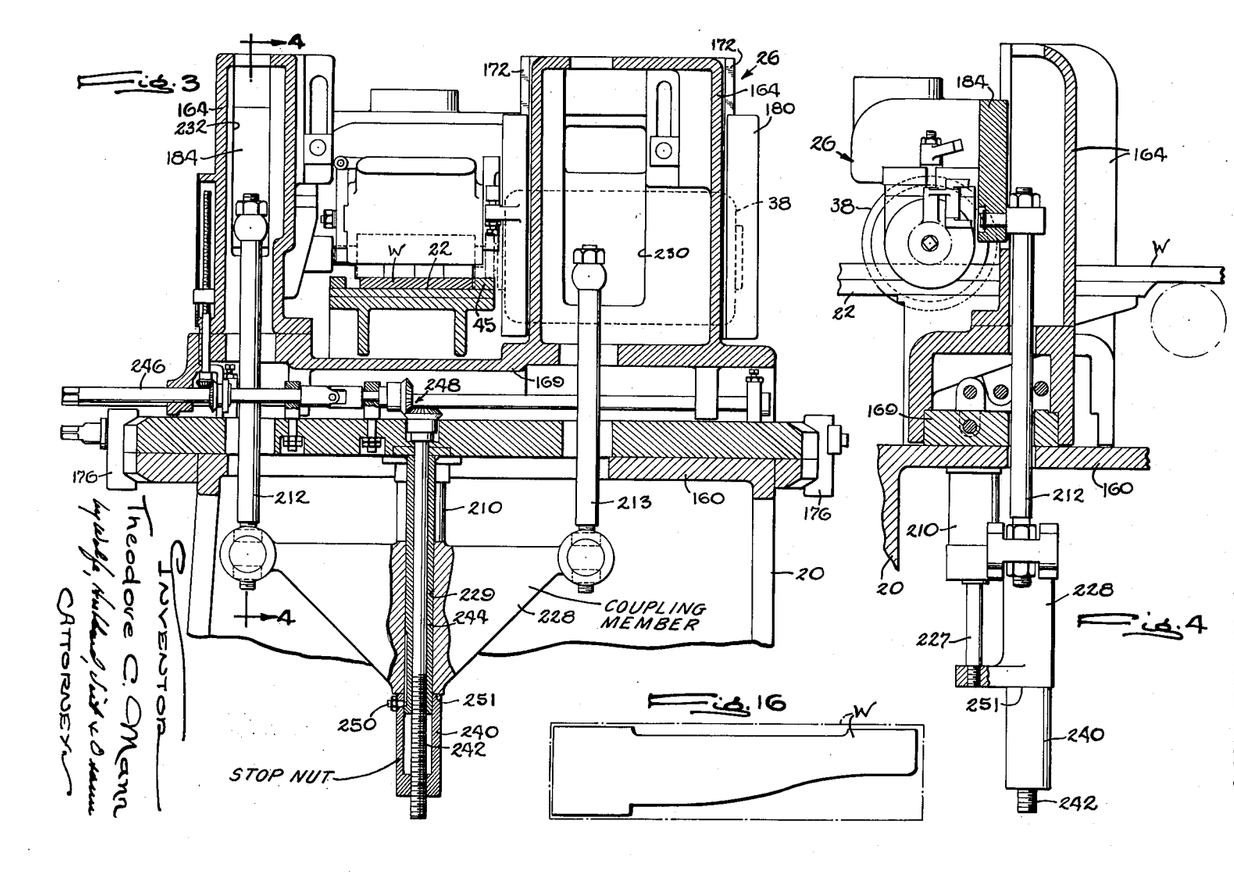
Fig. 3 is an enlarged sectional view taken in the plane defined by lines 3—3 of Figure 1.
Fig. 4 is a vertical sectional view taken in the plane defined by the lines 4—4 of Fig. 3.
Fig. 16 is an end view of a piece of stock with the inside lines showing the shape of a piece of finished moulding.

Referring now to Figs. 3 and 4 which show the details of the top cutting head 26, in keeping with the present invention the top cutting head may be advanced and retracted from a set position in engagement with the stock by hydraulic means so as to provide accessibility to the bed plate 22. To this end the present machine includes a hydraulic cylinder 210 connected to the top cutting head by a pair of upright rods 212, 213. The hydraulic cylinder, as shown in Fig. 15 diagrammatically, has a piston 214 for raising and lowering the cutting head relative to the bed plate 22. As shown in this same figure, a hydraulic circuit is provided to connect the cylinder to the pump P. Thus a supply line 216 and a return line 218 supply fluid to the cylinder 210 under the control of a control valve 220. In the position of the valve handle 222 shown in Fig. 15, fluid under pressure is applied through the supply line 216 to the line 224 leading to the upper end of the power cylinder 210, while the lower end of the power cylinder is connected to a line 226 and the valve 220 to the return line 218 connected to the sump. By moving the control valve handle to the right in Fig. 15, it will be evident the connections to the power cylinder 210 are reversed to lift the top cutting head.

The mechanical linkage coupling the power cylinder 210 and top cutting head components are shown in detail in Figs. 3 and 4. In the present case the power cylinder 210 which is fixed beneath the swivelable upright system 169 has a downwardly extending piston rod 227 which is fastened to a triangular coupling member 228 having a longitudinal bore 229. The opposite ends of the triangular coupling member 228 are fastened by means of the upright rods 212, 213 as shown in Fig. 3, to the slides 180, 184 for the motor and outboard support, respectively. The upper ends of the upright rods 212, 213 reach through openings 230, 232 in the face of the posts 164 to be connected to the slides comprising the top cutting head.

It is further in accordance with this invention to provide a stop mechanism associated with the hydraulic means for positioning the top cutting head, by means of which the set position of the head may be readily yet precisely adjusted, to provide for reaction and advancing the top cutting head to the set position without requiring readjustment.

The adjustment of the angle of inclination of the axis of the spindles of both the top and bottom heads, by swiveling the latter and then clamping in a fixed position, is an important feature of the machine shown, since it permits the use of straight cutting blades for the cutters rather than the helical blades ordinarily used heretofore to obtain a shearing cut. It will be observed, moreover, particularly with respect to the top head 26, that the power means for adjusting the vertical position of the head is carried entirely by the swivelable upright system supporting the head so as to permit swivelling of the head without interference with the power linkages.

The stop mechanism for the top cutting head is shown in Figs. 1, 3, 4 and 15. A stop nut 240 is threaded on the lower end of a stop adjusting rod 242 rotatably received in the center of a hollow sleeve 244 carried below the swivelable upright system supporting the head and extending through the bore 229 in the triangular coupling member 228. An adjusting shaft 246 leading to the front of the machine is coupled by means of bevel gears 248 to the stop adjusting rod carrying the stop nut so that by means of a socket wrench fitted on the end of the adjusting shaft the operator may rotate the latter to adjust the vertical position of the stop nut. A scale 249 on the front of the machine provides the operator with a visual indication of the set position. The stop nut is held against turning by a pin 250 sliding in a groove in the lower part of the sleeve 244. The set position for the top cutting head (the head is shown in the lowermost position in Fig. 3) is determined by the engagement of the stop surface 251 on the lower edge of the triangular member 228 coupled to the power cylinder and the head, and the upper edge of the stop nut 240. As shown in Fig. 3, the stop nut is adjustable vertically on the stop adjusting rod so as to vary the lowered set position of the top cutting head. It will be noted that in the present case the stop mechanism, as well as the hydraulic means for the top cutting head, are carried by the swivelable upright system so as to form a completely unitary component which affords adjustment of the angle of inclination of the spindle as well as adjustment vertically of its position.

Side cutting heads

As has been indicated previously, the right side cutting head 28 (Figures 1 and 2) is located in advance of the left side cutting head 30 so that the stock W is first shaped by the cut on the right side adjacent the stock guide 46 after the top cutting head has produced the desired contour on the top of the stock. The guide plate 45 mounted on the back side of the bed plate 22 extends from the input end of the machine to the right side cutting head 28, terminating at a point just adjacent the latter. Stock fed by the feed rollers 24A–D under the top cutting head is guided by means of the first guide plate 45 to the right side cutter.

The mechanism for adjusting the position of the right side cutting head 28 is not shown in detail, it being understood that any suitable support and adjustment means may be provided for this purpose. In this machine the right side cutting head has a motor 40 (Fig. 2) with a vertical motor shaft on which the cutters may be directly mounted. Adjustments of the shaft position may be required to produce different contours in view of the character of the wood and the type of cutters used, or to vary the thickness of the cut or the like. However, in general the right side cutting head 28 on this machine may be considered a fixed head.

In carrying out the invention, the left side cutting head 30 is a movable head for this purpose including a slide 257 mounted on flat ways 258 (Figure 1) on the bed for horizontal sliding movement to and from a set position in engagement with the stock. The set position of the left side cutting head 30 is determined by a stop mechanism comprising in the present instance a stop nut 260 (Figs. 2, 15) carried on a horizontal stop adjusting rod 262 extending for adjustment purposes to the front of the machine. As shown in Fig. 15, the stop adjusting rod 262 extends through an opening in a vertical plate 264 movable with the cutting head, which presents a stop surface 266 adapted to be engaged by the stop nut 260 to determine the set position of the head.

A hydraulic power cylinder 268 (Fig. 2) receiving a piston 270 coupled by a rod 272 to the slide 257 provides for moving the left side cutting head to and from its set position as established by the stop mechanism. The power cylinder 268 is supplied with pressure fluid from the pump P of the hydraulic circuit shown in Fig. 15, by a control valve 273 arranged to connect the supply line from the pressure side of the pump selectively to either end of the cylinder. The handle 274 to operate the control valve is located on the front of the machine along with the other machine controls. In the position of the valve 273 with the control valve handle 274 located as shown in Fig. 15, the supply line from the pump P is connected to the left end of the cylinder 268 while the right end of this cylinder is connected to the return line 82 leading to the sump S. By reversing the position of the handle 274, the right side cutting head is retracted from the set position allowing access to the bed plate 22 for adjustment of the machine components, for replacement of cutters, or for other reasons.

Mounted adjacent the right side cutting head spindle, as shown in Fig. 2, are the rollers 48 which bear directly against the side of the stock as it is fed past the cutters. The rollers 48 are spring biased against the stock, tending to hold the stock against the stock guide on the opposite side of the bed plate.

*Hold-down bar*

It has been previously set forth that a hold-down bar 50 is provided over the bed and adapted to press down on the stock as it emerges from the top cutting head 26 to hold it flat against the bed plate surface while the staggered side cutters and the bottom cutter operate to shape the surfaces of the stock.

Figure 5:
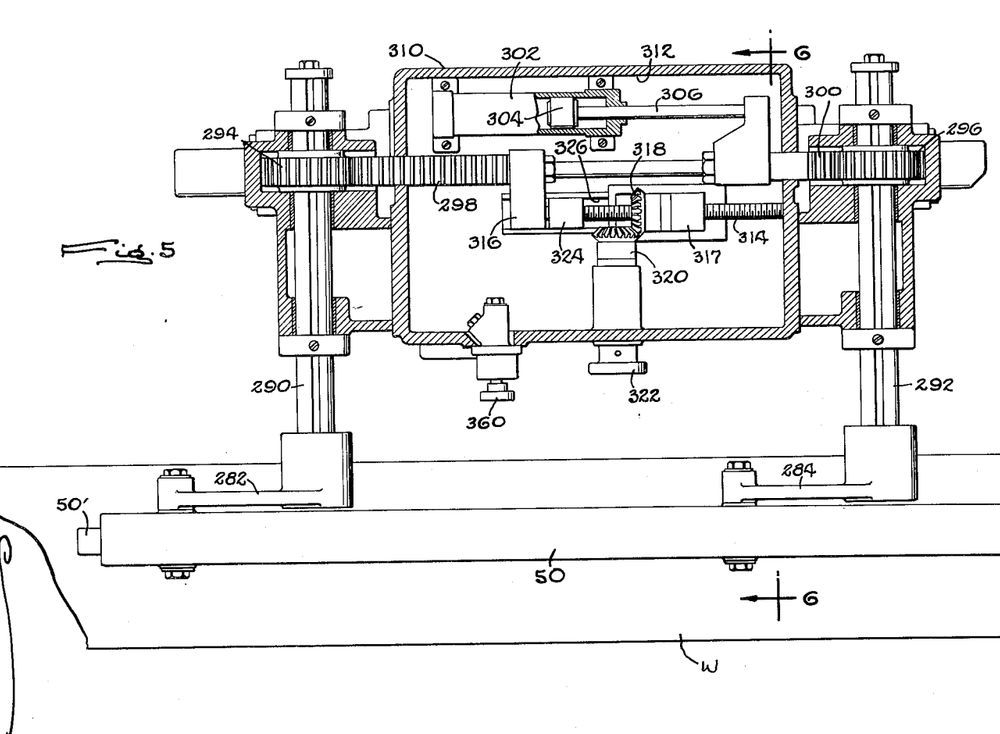
Fig. 5 is an enlarged horizontal sectional view taken in the plane of lines 5—5 of Fig. 1.
Figure 6:
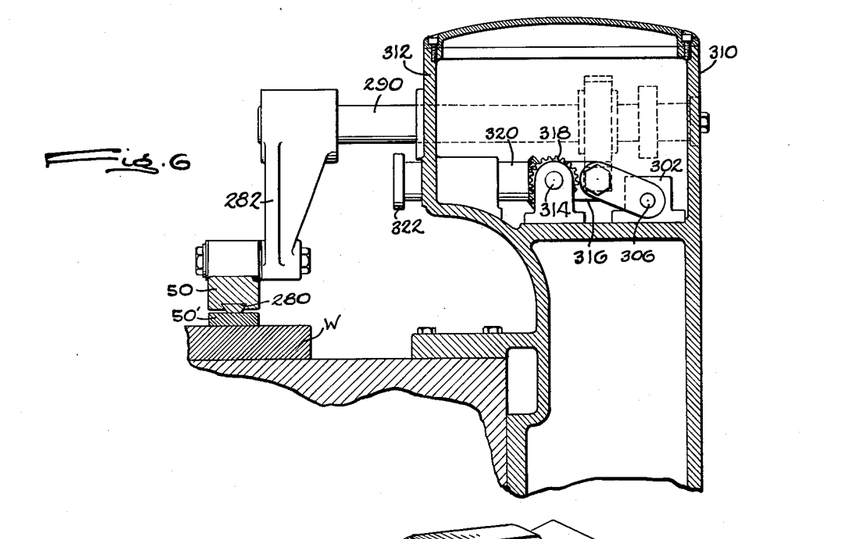
Fig. 6 is a sectional view taken in the plane of lines 6—6 of Fig. 5.
Figure 7:
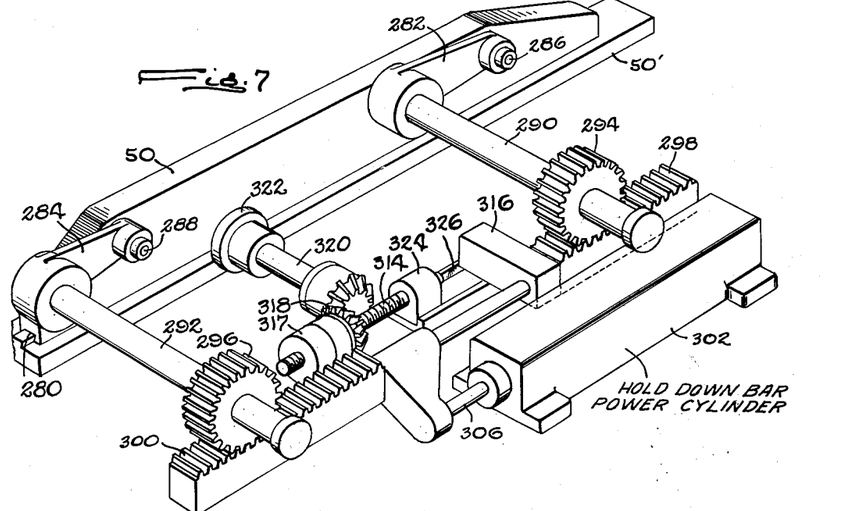
Fig. 7 is a fragmentary perspective view of the hold-down bar and operating means therefor.

The mechanism for supporting the hold-down bar 50 for vertical movement is best shown in Figures 1, 2, 5–7 and 15. The hold-down bar 50 has a dovetail groove 280 in the under side for holding a facing 50′ which may be shaped to conform to the surface cut by the top cutters. It is supported by a pair of parallel arms 282, 284, one of the arms being connected adjacent each end of the hold-down bar by a pin 286, 288, or equivalent support, which allows the arm to turn freely about the support. The other end of each arm 282, 284 is fixed to a horizontal shaft 290, 292 having a pinion 294, 296 meshing with a horizontally adjustable rack having rigidly joined sections 298, 300 meshing with the pinions, respectively. A power cylinder 302 receiving a piston 304 connected by a rod 306 to the rack provides hydraulic means for moving the rack thereby pivoting the arms carrying the hold-down bar, to lift and lower the hold-down bar under the control of the operator. As shown in Figs. 5 and 6, the shafts 290, 292 supporting the hold-down bar arms 282, 284 are journaled in a column 310 carried by the machine bed in back of the bed plate 22. A hollow casing 312 provides means for supporting and enclosing the rack and pinion drive and the power cylinder for operating the hold-down bar.

It is a feature of the invention that a stop mechanism is provided in association with the hydraulic means for positioning the hold-down bar 50 so that the latter may be rapidly and conveniently retracted from and advanced to a set position determined by the stop mechanism, without requiring readjustment each time the hold-down bar is lifted away from the bed plate. The stop mechanism includes a stop rod 314 the end of which (Figs. 5, 7, 15) serves as an abutment for a bar 316 extending laterally from the rack assembly and moved in unison with the rack sections 298, 300. The threaded stop rod 314 is received in a nut 317 which to adjust the rod is fixed to turn with a bevel gear 318 of a pair of bevel gears operated by an adjusting shaft 320 extending to the front of the casing 312 where a handle 322 is provided. The free end of the rod 314 is held within a block 324 which moves along a slide 326 as the stop rod shifts longitudinally when adjusted.

In keeping with an important feature of the invention, means is provided for limiting the pressure which the hold-down bar 50 exerts on a piece of stock passing through the machine. For this purpose, as shown in Fig. 15, the hydraulic circuit providing fluid under pressure to the power cylinder 302 which operates the hold-down bar 50 includes a control valve 340 operated by a handle 341 so as to be effective selectively to connect the supply and return lines 80, 82 to the power cylinder. To prevent the hold-down bar from being lowered when the power is off, means is provided for precluding the flow from the left end of the cylinder 302 under such condition. This means comprises a pair of check valves 344, 346 connected in a closed loop to the end of the line 342. One check valve 344 (Fig. 15) is closed by fluid flow from the cylinder confining the flow to the line section having the other check valve 346. This latter check valve 346 has a relatively strong spring 348 tending to seat the ball thus requiring relatively high pressure to lift the ball from its seat and thereby remains closed against the weight of the hold-down bar. The first-mentioned check valve 344 has a relatively light spring 350 tending to seat the ball so that when the position of the control valve is reversed by moving the valve to the left, to supply the left end of the power cylinder with fluid under pressure and thereby to raise the hold-down bar 50, the ball check valve 344 in the line 342 connected to the cylinder 302 offers minimum resistance to such flow.

As explained above, to avoid damage to the stock, means is provided to limit the downward pressure exerted by the hold-down bar 50. For this purpose a by-pass line 352 is connected in the line 354 leading to the right end of the power cylinder 302, and a by-pass valve 356 is arranged in the by-pass line. This by-pass valve 356 is of conventional type and is arranged to normally close by a spring 358 which may be adjusted by a set screw 360. Once the hold-down bar 50 is advanced into engagement with the stock W by moving the control handle to the position shown in Fig. 15, it is under the control of the valve 356. If the back pressure created by force lifting the hold-down bar 50 should become great enough to overcome the spring pressure acting on the by-pass valve 356, the latter valve opens to release excess fluid thereby relieving the back pressure allowing the hold-down bar 50 to assume another position while the pressure exerted by the bar will not exceed the limit set by the adjusting screw 360 on the by-pass valve.

To facilitate the safe, correct operation of the moulding machine shown in the drawings, the controls and adjustment means for the hydraulically operated heads and hold-down bar, and associated stop mechanisms, are located to be accessible from the front of the machine and in a group at separate locations for each component. Thus the control valve handle 84 for the feed roller head 60 is located (Figure 1) toward the right end of the machine, while the stop adjustment mechanism is actuated by manually turning the stop nut 86 which is located above the column 64 at the back of the machine. Thus both of these control devices for the feed roller head 60 are readily accessible to the operator.

The stop mechanism for setting the operating position of the top cutting head 26 is adjusted by a shaft 246 the end of which is on the front of the machine so that it may be turned by a socket wrench fitted on the end of the shaft. A fixed scale 249 on the column slidably carrying the top head furnishes a visual indication of the set position, which speeds up the procedure of fixing the set position of the cutters, normally a completely cut-and-dry procedure. The handle 222 for operating the hydraulic means to position the top cutting head is located to the left of but in proximity to the adjusting shaft 246 for the stop mechanism, on a panel at the midpoint of the machine.

Similarly, the adjusting screw 262 for the left side head stop mechanism, and the control handle 274 which is mounted on this same panel, for operating the hydraulic control valve to position this head, are located in near proximity to each other on the front of the machine. A scale 365 is provided and a pointer movable with the head affords a visual indication of the position of the side cutter.

The control handle 341 for operating the hydraulic circuit to raise and lower the hold-down bar 50 is also located on the panel at the midpoint of the machine. As mentioned above, the stop mechanism adjusting knob 322 associated with the hold-down bar, is mounted on the casing 312 above and behind the hold-down bar.

Other adjustment and control devices are found on the front of the machine. For example, adjusting shafts for positioning the angle of inclination of the top cutter spindle and the bottom cutter spindle, by adjustment of the swivels, and to actuate the associated clamp mechanism, are provided at separate locations on the front of the machine. As mentioned previously, the drop table at the end of the bed may be adjusted by means of inclined ways 140 and a hydraulic means of actuation and a control handle 367 for operating the valve means to control the latter is found adjacent this component at the left end of the machine.

I claim as my invention:

1. In a wood shaping machine, a bed to support a piece of stock for movement in a straight horizontal path, means for shaping the stock including a power driven vertical side cutter mounted in fixed position on said bed to engage one side of the stock, and a power driven horizontal bottom cutter mounted in fixed position on said bed to engage the bottom of the stock, means for shaping the other side and top of the stock including a plurality of individually powered cutting heads carried by said bed for movement toward and away from a set position in engagement with the side and top of the stock respectively, stop means associated with each of said cutting heads, means for adjusting said stop means to fix the set positions of said cutting heads, and means including hydraulic cylinders having pistons connected to said heads and selectively operable to advance and retract the latter to and away from said set positions fixed by said stop means.

2. In a wood shaping machine, a bed to support a piece of stock for movement in a straight horizontal path, a stock guide mounted on the bed to extend along one side of said path, means for shaping the stock including a power driven vertical side cutter mounted in fixed position on said bed to engage said one side of the stock at a point adjacent the leading end of said stock guide, and a power driven horizontal bottom cutter mounted in fixed position on said bed to engage the bottom of the stock at a point adjacent the trailing end of said stock guide, means for shaping the other side and top of the stock including a plurality of individually powered cutting heads carried by said bed for movement toward and away from a set position in engagement with the side and top of the stock respectively, stop means associated with each of said cutting heads, means for adjusting said stop means to fix the set positions of said cutting heads, and means including hydraulic cylinders having pistons connected to said heads and selectively operable to advance and retract the latter to and away from said set positions fixed by said stop means.

3. In a wood shaping machine, a bed to support a piece of stock for movement in a straight horizontal path; a stock guide mounted on said bed to extend along one side of said path; means for shaping the stock including a fixed side head having a vertical spindle on said one side of the path adjacent the leading end of said stock guide, and a fixed bottom head having a horizontal spindle beneath the bed surface adjacent the trailing end of said guide; a column carried by said bed spaced forwardly along the path of the stock from the stock guide; means for shaping the other sides and top of the stock including a top head mounted for vertical slidable movement on said column to and away from a set position over said bed, said top head having a horizontal spindle, and a side head mounted for horizontal slidable movement on said bed to and away from a set position opposite the stock guide and intermediate the ends thereof, said last-named side head having a vertical spindle; and means including hydraulically powered cylinders having pistons operably connected to said top head and said last-named side head for moving the latter to and from said set positions.

4. In a wood shaping machine, a bed to support a piece of stock for movement in a straight horizontal path, a feed roller head mounted at one end of the bed having rollers engageable with the stock to feed the latter along said path, an upright system carrying said feed roller head for vertical movement to and from an operative position in which said rollers engage a piece of stock on the bed, a stock guide mounted on the bed spaced from the feed roller head and extending along one side of said path, cutting head means for shaping all four sides of the stock on one pass along said path through the machine including an individually powered top cutting head having a horizontal spindle, a pair of individually powered side cutting heads having vertical spindles mounted one on each side of said path, and an individually powered bottom cutting head having a horizontal spindle mounted adjacent the trailing end of said stock guide under said path, a hold-down bar extending lengthwise of said path above said stock guide and bottom cutting head, means for mounting said hold-down bar on said upright system for vertical movement to and from an operative position in engagement with the top of a piece of stock on the bed, and hydraulic power means for raising and lowering said feed roller head, said hold-down bar, and said top cutting head, and for moving one of said side cutting heads horizontally to and from a set position in engagement with a piece of stock at a point opposite said stock guide, said last-named means including a piston coupled to each of said last mentioned heads, cylinders in which each piston is slidably received, and a hydraulic circuit having a source of hydraulic fluid and means including a control valve connecting said source to each cylinder for selectively actuating said pistons.

5. In a wood shaping machine, a bed to support a piece of stock for movement in a straight horizontal path, a stock guide mounted on the bed to extend along one side of said path, means for shaping two sides of the stock including a power driven vertical side cutter mounted on said bed to engage said one side of the stock at a point adjacent the leading end of said stock guide, and a power driven horizontal bottom cutter having a spindle mounted to be swivelable on a vertical axis on said bed to adjust the angle of inclination thereof and adapted to carry a cutter engageable with the bottom of the stock at a point adjacent the trailing end of said stock guide, means for shaping the other side and top of the stock including individually powered side and top cutting heads carried by said bed for movement toward and away from a set position in engagement with the side and top of the stock respectively, said stop cutting head including a horizontal spindle mounted to be swivelable on a vertical axis to adjust the angle of inclination thereof, stop means associated with each of said cutting heads, means for adjusting said stop means to fix the set positions of said cutting heads, and means including hydraulic cylinders having pistons connected to said heads and selectively operable to advance and retract the latter heads to and away from said set position fixed by said stop means.

6. In a woodworking machine, a bed to support a piece of stock for movement in a straight horizontal path, a feed roller head mounted at one end of the bed, a roller carried by said head, an upright system carrying said feed roller head for vertical movement to and from an operative position in which said roller engages the top of a piece of stock to move the latter along said path, and means for floatably mounting said feed roller on said head with the latter at an operative position to allow said feed roller to follow irregularities in thickness of the stock, said last-named means including a support member pivotally carrying said roller on said head, and hydraulic means connected to said support member and operable by fluid for applying pressure on said member to press said roller downward into engagement with the stock, upward movements of said roller tending to raise fluid back pressure from said hydraulic means, said hydraulic means including a unit for controlling the fluid pressure having a member responsive to fluid pressure and operative to maintain said fluid pressure constant despite variations in back pressure.

7. In a woodworking machine, a bed to support a piece of stock for movement in a straight horizontal path, a feed roller head mounted at one end of the bed, a pair of feed rollers carried by said head, an upright system carrying said feed roller head for vertical movement to and from an operative position in which said rollers engage the top of a piece of stock to move the latter along said path, and means for floatably mounting said feed rollers on said head to allow said feed rollers to follow irregularities in thickness of the stock including a support member pivotally carrying each roller on said head, and hydraulic means for applying a downward pressure on said members to press said rollers into engagement with the stock including a piston operably connected to both said members, a cylinder mounted on the head and slidably receiving said piston, a source of hydraulic fluid connected to one end of said cylinder so as to apply fluid under pressure to said piston, a normally closed by-pass valve means in said hydraulic connection operable in response to back pressure exceeding a predetermined value to open and allow flow from said cylinder thereby permitting said rollers to lift in following said stock irregularities.

8. In a woodworking machine, a bed to support a piece of stock for movement in a straight horizontal path, a feed roller head mounted at one end of the bed having a pair of rollers engageable with the stock to feed the latter along said path, an upright system carrying said feed roller head for vertical movement to and from an operative position in engagement with a piece of stock on the bed, and means for floatably mounting said pair of feed rollers on said head so that said feed rollers follow irregularities in thickness of the stock including a support member pivotally carrying each roller on said head, an equalizing bar spanning said support members, and hydraulic means for applying a downward pressure on said bar to press said rollers into engagement with the stock including a bell crank pivotally mounted intermediate its ends on said head and connected at one end to said equalizing bar, a piston connected to the other end of said bell crank, a cylinder mounted on the head and slidably receiving said piston, a source of hydraulic fluid connected to one end of said cylinder so as to apply fluid under pressure to said piston to press said equalizing bar against the roller support members, and a normally closed by-pass valve means in said hydraulic connection operable in response to back pressure exceeding a predetermined value to open and allow flow from said cylinder thereby permitting said equalizing bar and rollers to lift in following said stock irregularities.

9. In a woodworking machine, a bed to support a piece of stock for movement in a straight horizontal path, a feed roller head mounted at one end of the bed, and means for floatably mounting a pair of feed rollers on said head to allow said feed rollers to follow irregularities in thickness of the stock including a support member pivotally carrying each roller on said head, an equalizing bar spanning said support members, and hydraulic means for applying a downward pressure on said bar to press said rollers into engagement with the stock on said bed including a piston operably connected to said equalizing bar, a cylinder mounted on the head and slidably receiving said piston, a source of hydraulic fluid, and means connecting said source to said cylinder including a valve effective to apply a uniform fluid pressure to said piston.

10. In a woodworking machine, a bed to support a piece of stock for movement in a straight horizontal path, a feed roller head mounted at one end of the bed, a pair of rollers carried by said head, an upright system carrying said feed roller head for vertical movement to and from a set position in which said rollers engage the top of a piece of stock to move the latter along said path, stop means associated with said head, means for adjusting said stop means to fix the set position of said head, means including a hydraulic cylinder having a piston connected to said head to advance and retract the latter relative to said set position fixed by said stop means, and means for floatably mounting said feed rollers on said head to allow said feed rollers to follow irregularities in thickness of the stock including a support member pivotally carrying each roller on said head, and hydraulic means operable to press said rollers downwardly into engagement with the top of a piece of stock on said bed while said head is in said set position including a cylinder mounted on the head having a piston operably connected to said rollers, a source of hydraulic fluid connected to said cylinder, and valve means effective to maintain a constant fluid pressure acting on said last-mentioned piston.

11. In a woodworking machine, the combination comprising, a bed to support a piece of stock for movement in a straight horizontal path, a hold-down bar extending lengthwise of said path, an upright system carrying said hold-down bar for vertical movement over said bed into engagement with a piece of stock moving along said path, and hydraulic means for raising and lowering said hold-down bar including a piston operably coupled thereto, movement of said piston in one direction being effective to lift said hold-down bar and movement in the other direction being effective to press said hold-down bar against the top of said stock, a cylinder mounted on the system and slidably receiving said piston, a source of hydraulic fluid, means including a control valve for selectively connecting said source to said cylinder, and valve means associated with said control valve operable in response to back pressure exceeding a predetermined value to open and allow flow from said cylinder so as to allow said hold-down bar to lift.

12. In a woodworking machine, the combination comprising, a bed to support a piece of stock for movement in a straight horizontal path, a hold-down bar extending lengthwise of said path, an upright system carrying said hold-down bar for vertical movement over said bed into engagement with a piece of stock moving along said path, and hydraulic means for raising and lowering said hold-down bar including a piston, movement of said piston in one direction being effective to lift said hold-down bar and movement in the other direction being effective to press said hold-down bar against the top of said stock, a cylinder mounted on the system and slidably receiving said piston, a source of hydraulic fluid, means including a control valve for selectively connecting said source to said cylinder, and a normally closed by-pass valve hydraulically connected to said cylinder operable in response to back pressure exceeding a predetermined value to open and allow flow from said cylinder so as to allow said hold-down bar to lift.

13. In a woodworking machine, the combination comprising, a bed to support a piece of stock for movement in a straight horizontal path, a hold-down bar extending lengthwise of said path, an upright system carrying said hold-down bar for vertical movement over said bed into engagement with a piece of stock moving along said path, means for mounting said hold-down bar including parallel arms pivotally mounted on said upright system, one of said arms being connected adjacent each end of the hold-down bar, and hydraulic means for raising and lowering said hold-down bar including a piston coupled to pivot said arms about each respective axis of support, movement of said piston in one direction being effective to press said hold-down bar against the top of the stock, a cylinder slidably receiving said piston, a source of hydraulic fluid, means including a control valve and a line for selectively connecting said source to one end of said cylinder so as to move said piston in said one direction, and a normally closed by-pass valve interposed in said line operable in response to back pressure exceeding a predetermined value to open and allow flow from said cylinder thereby limiting the pressure exerted by said hold-down bar against the stock.

14. In a wood shaping machine, a bed to support a piece of stock for movement in a straight horizontal path, an individually powered top cutting head for shaping the top of the stock and means for mounting said head including a base supported on said bed, an upright system swivelable on said base, a slide carried by said upright system for vertical movement toward and away from said bed, a motor on said slide having a horizontal spindle movable with said slide to and away from a set position in cutting engagement with a piece of stock on said bed, the angle of inclination of said spindle being adjustable with respect to the path of the work by swiveling said upright system on said base, stop means mounted on said upright system, means for adjusting said stop means to fix the set position of said spindle, and means including a hydraulic cylinder mounted on said upright system and having a piston connected to move said slide vertically on the upright system so as to advance and retract the spindle to and away from the set position fixed by said stop means.

15. In a woodworking machine, a bed to support a piece of stock for movement in a straight horizontal path, a top cutting head having a horizontal spindle located intermediate the ends of the bed, a swivelable upright system mounted on said bed and having vertical ways carrying said top cutting head for vertical sliding movement toward and away from a set position in engagement with the top of the stock, said upright system being swivelable on said bed to incline the cutting head spindle relative to the path of the stock, stop means carried by said upright system associated with said top cutting head, means for adjusting said stop means to fix the set position of said cutting head, and means including a hydraulic cylinder carried by said upright system selectively operable to advance and retract the cutting head toward and away from said set position fixed by said stop means.

16. In a wood shaping machine, a bed having a plate to support a piece of stock for movement in a straight horizontal path, an individually powered top cutting head mounted over the bed plate for shaping the top of the stock including a base fixed on said bed below said plate, an upright system swivelable on said base including a pair of columns straddling said plate and extending above the latter, a slide carried by each of said columns over said plate for vertical movement, a motor on one slide having a horizontal spindle, an outboard support for said spindle on the other slide, said spindle being movable with said slides toward and away from a set position in cutting engagement with a piece of stock on said bed, said upright system mounting providing means for adjusting the angle of inclination of said spindle with respect to the path of the work by swiveling said upright system on said base, stop means to fix the set position of said spindle mounted on said upright system, means for adjusting said stop means, and means including a hydraulic cylinder mounted on said upright system and connected to move said slides vertically on the columns so as to advance and retract the spindle to and away from the set position fixed by said stop means.

17. In a woodworking machine, a bed having a bed plate to support a piece of stock for movement in a straight horizontal path, a cutting head having a horizontal spindle located intermediate the ends of the bed, a swivelable upright system mounted on said bed including a pair of columns straddling said bed plate and presenting vertical ways, said cutting head including spindle supporting members mounted on the ways on both said columns for vertical sliding movement toward and away from a position in which said spindle is in cutting engagement with the surface of the stock, the mounting of said upright system on said bed providing means for adjusting the cutting head spindle at an angle relative to the path of the stock by swivelling the head, and means for moving said spindle supporting members vertically on the column ways to advance and retract the cutting head toward and away from said cutting position.

18. In a wood shaping machine, a bed to support a piece of stock for movement in a straight horizontal path, means for shaping the stock including a power driven vertical side cutter mounted on said bed to engage one side of the stock, and a power driven horizontal bottom cutter mounted on said bed to engage the bottom of the stock, means for shaping the other side and top of the stock including a plurality of individually powered cutting heads carried by said bed for movement toward and away from a set position in engagement with the side and top of the stock respectively, stop means associated with each of said cutting heads, means for adjusting said stop means to fix the set positions of said cutting heads, and power means connected to said heads and selectively operable to advance and retract the latter to and away from said set positions fixed by said stop means.

References Cited in the file of this patent

UNITED STATES PATENTS

| Number | Name | Date |
|---|---|---|
| 338,973 | Johnson | Mar. 30, 1886 |
| 941,751 | Anderson | Nov. 30, 1909 |
| 1,295,875 | Eaglesfield | Mar. 4, 1919 |
| 1,333,710 | Folsom | Mar. 16, 1920 |
| 1,450,695 | Marshall et al. | Apr. 3, 1923 |
| 2,312,439 | Peterson | Mar. 2, 1943 |
| 2,564,904 | Jacobson | Aug. 21, 1951 |
| 2,684,088 | Miller | July 20, 1954 |
| 2,725,084 | Carlson | Nov. 29, 1955 |